UNITED STATES PATENT OFFICE.

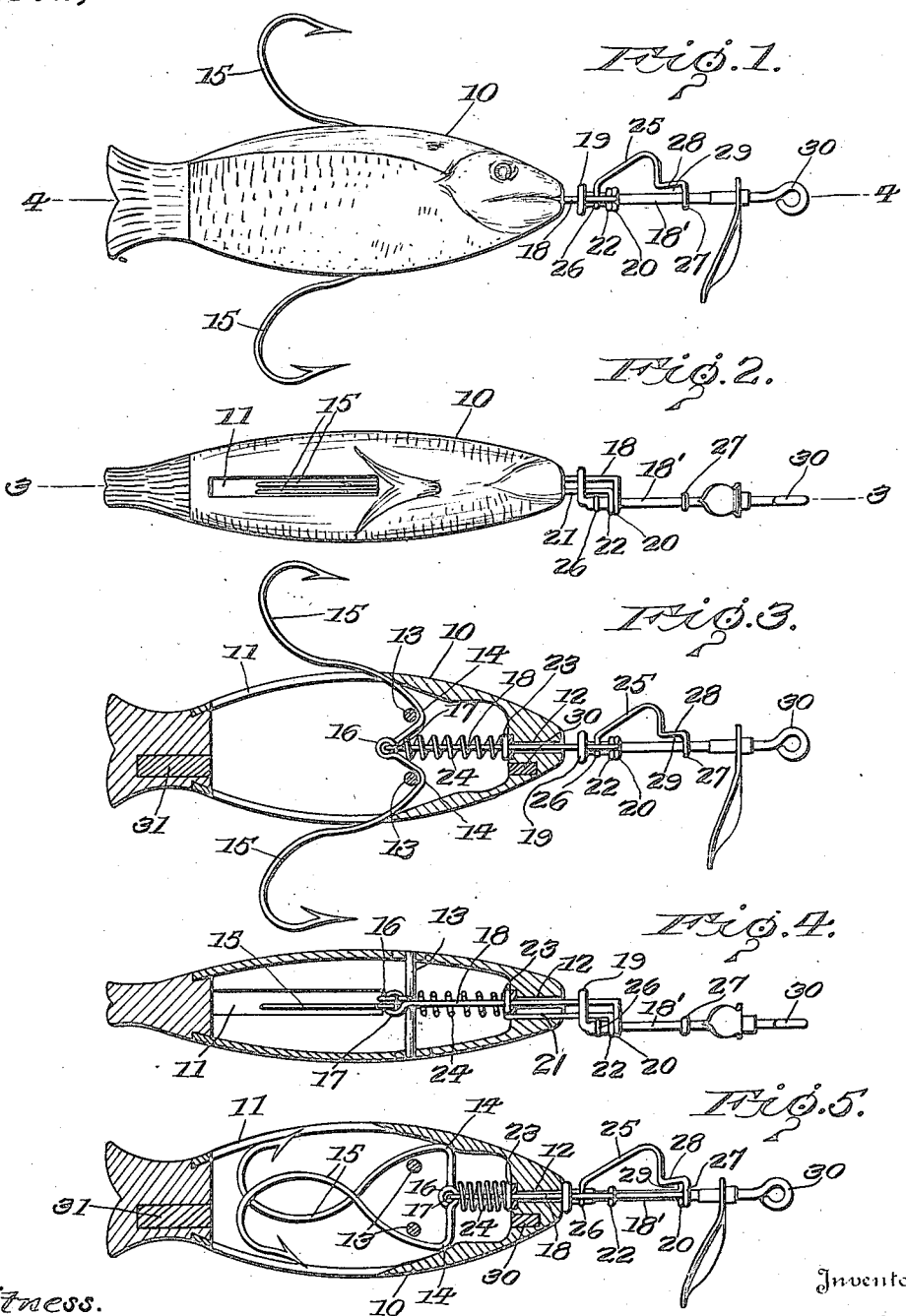

GLEN M. RODERICK, OF CHICAGO, ILLINOIS.

ARTIFICIAL BAIT.

1,372,831.  Specification of Letters Patent.  Patented Mar. 29, 1921.

Application filed November 2, 1920. Serial No. 421,353.

*To all whom it may concern:*

Be it known that I, GLEN M. RODERICK, a citizen of the United States, residing at Chicago, in the county of Cook, State of Illinois, have invented certain new and useful Improvements in Artificial Bait; and I do hereby declare the following to be a full, clear, and exact description of the invention, such as will enable others skilled in the art to which it appertains to make and use the same.

This invention relates to new and useful improvements in fishing devices and particularly to artificial bait.

One object of the invention is to provide an artificial bait in which the hooks are so arranged that all danger of such hooks catching in weeds, or other obstructions in the water, is obviated.

Another object is to provide an artificial bait in which the hooks can be swung into the body of the bait and retained therein to be moved out only at such time as the bait is grasped in the mouth of the fish and a pull given on the bait.

A still further object is to provide an artificial bait of this character wherein the hooks will not be projected from the body of the bait when the line is cast.

Other objects and advantages will be apparent from the following description when taken in connection with the accompanying drawing.

In the drawing:

Figure 1 is an elevation of an artificial bait made in accordance with the invention, the hooks being projected from the body of the bait.

Fig. 2 is an edge view of the bait.

Fig. 3 is a longitudinal central sectional view through the bait, taken on the line 3—3 of Fig. 2, the hooks and connected parts being shown in elevation.

Fig. 4 is a longitudinal sectional view through the body of the bait on the line 4—4 of Fig. 1, at one side of the operating stems of the hooks, showing said operating stems in elevation.

Fig. 5 is a sectional view similar to that shown in Fig. 3, but showing the hooks withdrawn into the body of the bait and retained by the latching means.

Referring particularly to the accompanying drawing, 10 represents the body of the bait which is in the form of a minnow, and having a vertical longitudinal opening 11 throughout a portion of its length, with a longitudinal circular opening 12, said opening extending through the mouth of the minnow and into one end of the opening 11. Extending transversely through the opening 12, and at opposite sides of the body of the bait, are the pins 13 with which are engaged the angles 14 of the hooks 15. The gaffs of said hooks are arranged to extend through opposite sides of the opening 11 to engage the mouth of a fish, when the bait is taken into the fish's mouth. The inner ends of the hooks are formed with registering eyes 16 through which is engaged the eye 17 on the inner end of a wire 18, which extends through the opening of the mouth of the bait. A wire stem extends longitudinally from the mouth of the bait, and has in its inner end a laterally extending eye 19 through which the stem or wire 18 passes. The outer end of the wire 18 has a laterally turned eye 20 which embraces the stem 18', said eye being adapted to be slipped along said stem, in a manner, and for a purpose, which will later appear. A short stem 21 is disposed through the mouth of the bait and has an outer eye 22 which embraces the stem 18', and an inner eye 23 which embraces the wire 18, within the body of the bait. A coil spring 24 is disposed in encircling relation around the wire 18, and has its opposite ends bearing against the eye 23 and the eye 17, respectively. A wire loop 25 has eyes 26 and 27 on its opposite ends, and said eyes embrace the stem 18' at points adjacent the lateral eye 19 and adjacent the outer end of the stem, respectively. It will be noted that the inner eye 26 is secured to the stem 18', at the eye 19, by means of a drop of solder, thus holding the wire loop against longitudinal movement on the stem. The outer end portion of the loop is formed with a bend 28, which coöperates with the adjacent portion of the stem 18' to form a wedge opening 29, into which the eye 20 is adapted to be engaged when said eye is moved by the finger of the operator.

The outer end of the stem 18' has an eye 30 to which a line is adapted to be secured.

To set the bait, the operator holds the body in one hand and grasps the eye 20 with the nail of a finger of the same hand or of the other hand, drawing said eye outwardly on the stem 18' until said eye snaps into the opening 29, where it is retained by the coöperation of the stem and bend 28. When the eye 20 is moved outwardly the wire 18 is drawn through the mouth of the bait with the result that the hooks are rocked into position within the body of the bait, while at the same time the spring 24 is compressed between the eye 23 and the eye 17. The line is then cast and when a fish grabs the bait in its mouth, the natural movement of the fish is to turn to get away with the bait. This movement of the fish puts a sudden strain or jerk on the line with the result that the stem 18' together with the loop 25 is moved in a direction away from the bait, thus releasing the eye 20 from the wedge opening 29. The spring 24 then acts to move the wire rod 18 inwardly of the body of the bait, and thus projects the hooks out through the sides of the bait, where they will catch in the fish's mouth.

The wedge at 29 is sufficiently strong, and offers enough resistance to permit the proper casting of the line without being released, and also to prevent being caught in grass or weeds.

In the lower side of the head and tail of the bait body are embedded the lead weights 30 and 31, respectively, which serve to maintain the bait in proper upright position.

It will, of course, be understood, that the exterior and interior of the bait body are properly coated with a waterproof composition to prevent water-soaking.

What is claimed is:

1. An artificial bait including a body, hooks mounted in the body and projectable from opposite sides of the body, a line connection on the body, and means connected with the hooks and engageable with the line carrying means for release from the line carrying means to project the hooks.

2. An artificial bait comprising a hollow body, a pair of hooks within the body and arranged to be projected from opposite sides of the body, a spring actuated stem in the body and connected with the hooks, and a line connection, with which the stem is arranged to be engaged, adapted for movement away from the body to disengage the stem and project the hooks.

3. An artificial bait comprising a hollow body, a longitudinal stem within the body and having an external eye extending from one end of the body, a movable line connection slidably engaged with the said stem, a detent carried by the line connection for engagement by said external eye to maintain the stem in outwardly extended position, and a pair of hooks pivotally carried by the inner end of the stem and arranged to be projected from the opposite sides of the body when the longitudinal line connection is moved from engagement with the said external eye.

4. An artificial bait comprising a hollow body, a longitudinal rod in the body and extending through one end thereof, said end of the rod having a laterally turned eye, an external longitudinal line connecting stem having a lateral eye on its inner end embracing the rod and being in turn embraced by the eye of the rod for relative slidable movement, a short stem disposed through the said end of the body and having laterally and oppositely turned eyes on its opposite ends, one of said eyes of the short stem embracing the rod within the body and the other eye embracing the external stem, a pair of hooks within the body and pivotally connected to the inner end of the rod, a coil spring encircling the rod and bearing against the hook connection and the inner eye of the short stem, and a member carried by the line connecting stem and forming, in connection with said stem, a wedge opening for the reception and releasable retention of the outer eye of the rod.

In testimony whereof I affix my signature, in the presence of two witnesses.

GLEN M. RODERICK.

Witnesses:
A. M. LOVELL,
C. H. WAHL.